United States Patent [19]

Klein

[11] 4,366,561

[45] Dec. 28, 1982

[54] METHOD AND APPARATUS FOR TESTING A PLURALITY OF GEOPHONES

[75] Inventor: Fred T. Klein, Bartlesville, Okla.

[73] Assignee: Phillips Petroleum Company, Bartlesville, Okla.

[21] Appl. No.: 955,841

[22] Filed: Oct. 30, 1978

[51] Int. Cl.³ .............................................. G01V 1/22
[52] U.S. Cl. ...................................... 367/77; 367/13; 73/1 DV; 371/20
[58] Field of Search .................................. 367/13, 77; 179/175.3 F, 175.2 C, 175.2 D; 73/1 DV; 324/51, 52; 371/20, 15

[56] References Cited

U.S. PATENT DOCUMENTS

| Re. 29,580 | 3/1978 | Goodwater | 340/514 |
|---|---|---|---|
| 2,653,305 | 9/1953 | De Shezo | 367/13 |
| 2,917,706 | 12/1959 | Thompson | 324/73 |
| 3,351,898 | 11/1967 | Romberg | 367/13 |
| 3,566,399 | 2/1971 | Weld | 340/514 |
| 3,748,638 | 7/1973 | Montgomery et al. | 367/76 |
| 3,839,707 | 10/1974 | Woodward et al. | 340/505 |
| 3,886,494 | 5/1975 | Kostelmichek et al. | 367/77 |
| 3,952,283 | 4/1976 | Brading | 367/76 |
| 4,017,833 | 4/1977 | Brading | 367/77 |
| 4,042,906 | 8/1977 | Ezell | 367/76 |
| 4,043,175 | 8/1977 | Fredrickson et al. | 73/1 DV |
| 4,044,351 | 8/1977 | Everson | 340/505 |
| 4,086,504 | 4/1978 | Ezell et al. | 367/77 |
| 4,134,099 | 1/1979 | Lankford | 340/514 |
| 4,147,222 | 4/1979 | Patten et al. | 367/133 |
| 4,152,691 | 5/1979 | Ward | 367/77 |
| 4,166,270 | 8/1979 | Brastins et al. | 73/1 DV |

FOREIGN PATENT DOCUMENTS 603931  4/1978  U.S.S.R. ........................... 73/1 DV

OTHER PUBLICATIONS

Convert et al., "System Aids Field Testing of Geophones", 11/5/79, pp. 88-96, Oil and Gas Journal, vol. 77, #45.
"Gus-Bus Digital Seismic Telemetry System", 9/77, 21 pp., Gus Manufacturing Inc., Houston, Texas.
Rhodes "Piezoelectric Transducer ... Insertion," 4/62, pp. 216-219, Environmental Quarterly, Endevco Corp., Pasadena, Calif.

Primary Examiner—Nelson Moskowitz

[57] ABSTRACT

In a seismic exploration system wherein a plurality of geophones are utilized to detect seismic waves and transduce the detected seismic waves into representative electrical signals, method and apparatus is provided whereby a plurality of remotely located geophones can be tested from a central location to determine if the remotely located geophones are operable. Leakage tests, continuity tests and levitate tests are performed on the plurality of remotely located geophones and the results of these tests are transmitted to a central location.

6 Claims, 4 Drawing Figures

METHOD AND APPARATUS FOR TESTING A PLURALITY OF GEOPHONES

This invention relates to method and apparatus for testing geophones. In a particular aspect this invention relates to method and apparatus for testing remotely located geophones and transmitting the results of the tests of the remotely located geophones to a central location. In another particular aspect this invention relates to particular electronic circuits for testing geophones.

The seismic method of mapping geological subsurfaces of the earth involves the use of a source of seismic energy and its reception by an array of seismic detectors, generally referred to as geophones. When used on land, the source of seismic energy generally is a high explosive charge electrically detonated in a bore hole located at a selected grid point in a terrain or is an energy source capable of delivering a series of impacts to the earth's surface such as that used in Vibroseis. The acoustic waves generated in the earth by the explosion or impacts are transmitted back from pronounced strata boundaries and reach the surface of the earth after varying intervals of time, depending on the distance and the nature of the subsurface traversed. These returning acoustic waves are detected by the geophones, which function to transduce such acoustic waves into representative electrical signals. The plurality of geophones are arrayed in a selective manner to detect most effectively the returning acoustic waves and generate electrical signals representative thereof from which data may be deduced concerning the geological subsurface of the earth.

It is common today in seismic exploration to utilize 48 geophone stations simultaneously for every shot point location. The geophone stations are commonly laid out in a line which is referred to as a "seismic exploration spread". A 48-channel spread will usually extend from 7 to 9 miles. The geophone stations will usually be made up of a large number of individual geophones which are connected in series and in parallel. Usually several geophone strings are used in each geophone station so that spurious signals will be cancelled out and the strings will produce an average signal which is representative of the seismic wave.

Each geophone usually includes an interchangeable base which may comprise a spike or the like. This spike permits the geophone to be acoustically coupled to the earth. The basis of the operation of the geophone comprises a spring mounted weight responsive to mechanical vibrations to move a coil in a magnetic field to thereby produce electrical energy. The amount of electrical energy produced is in proportion to the amplitude of the seismic vibrations which the geophone senses.

As used herein, the term geophone shall be understood to mean any device which transforms mechanical vibrations into electrical energy. Geophones have been known for many years and are commercially available from a number of manufacturers. A preferred geophone model in the present invention is the Mark L15A by Mark Products, Inc.

It has become increasingly common in seismic exploration systems to utilize a plurality of remote geophone monitoring means to acquire seismic data. Each one of the plurality of remote geophone monitoring means is associated with and electrically coupled to at least one geophone station. Electrical signals generated by the geophone stations associated with a particular remote geophone monitoring means is provided to the remote geophone monitoring means which usually processes and stores the seismic data.

The plurality of remote geophone monitoring means are usually controlled from a central recording and control station. It is desirable that an operator at a central recording and control station be able to determine if each of the geophones associated with each of the geophone stations is operational before a shot is fired. In the past, it has been common to perform the geophone tests in a shop or as the geophones are being set out. The tests were performed by an operator who was with the geophones and was not performed from a central location. This has the disadvantage of requiring an operator to test the geophones as the geophones are being placed on the ground and also has the disadvantage of the lack of operational status of the geophones at the subsequent time when a shot is to be fired. Accordingly, it is an object of this invention to provide method and apparatus for testing remotely located geophones and transmitting the results of the tests on the remotely located geophones to a central location. It is another object of this invention to provide particular electronic circuits for testing geophones at a remote location.

In accordance with the present invention, a seismic exploration system is provided in which a central control station is utilized to control and acquire data from a plurality of remote geophone monitoring means. Each of the plurality of remote geophone monitoring means is associated with at least one geophone station. In response to a command from the central control station, a plurality of tests are performed on the geophone units by the remote geophone monitoring means and the results of these tests are transmitted back to the central control station to thereby provide an immediate indication as to the operability of the individual geophones in the geophone unit.

Three tests are preferably performed on the geophone units in response to the geophone test command from the central control station. These three tests are referred to as the leakage test, continuity test, and levitate test.

The leakage test measures the leakage resistance between the geophone string and ground. During the leakage test, in reponse to a command from the central control station, a voltage is supplied to one of the output terminals of the geophone station. Any current leakage from the geophone strings to ground produces a voltage divider action which has the effect of reducing the voltage supplied to the geophone strings. The difference between the voltage which was supplied to the geophone string and the voltage which is actually present is representative of the leakage resistance from the geophone string to ground.

The continuity test measures the internal resistance of the geophone string. To perform the continuity test, a voltage is again supplied to the geophone string. However, for the continuity test one terminal of the geophone string is grounded thus allowing current to flow through the geophone string. The voltage developed across the geophone string is proportional to the internal resistance of the geophone string.

The levitate test provides an indication of the response parameters of the geophone string. To perform the levitate tests, the mass of the geophone is levitated by applying a voltage to the geophone string. When the voltage is removed from the geophone string, the mass of the geophone oscillates about its original position causing a signal to be output by the geophone string. The output signal from the geophone string provides an indication of the response characteristics of the geophone string.

Other objects and advantages of the invention will be apparent from the detailed description of the invention and the appended claims as well as from the detailed description of the drawings in which:

Figure 1:
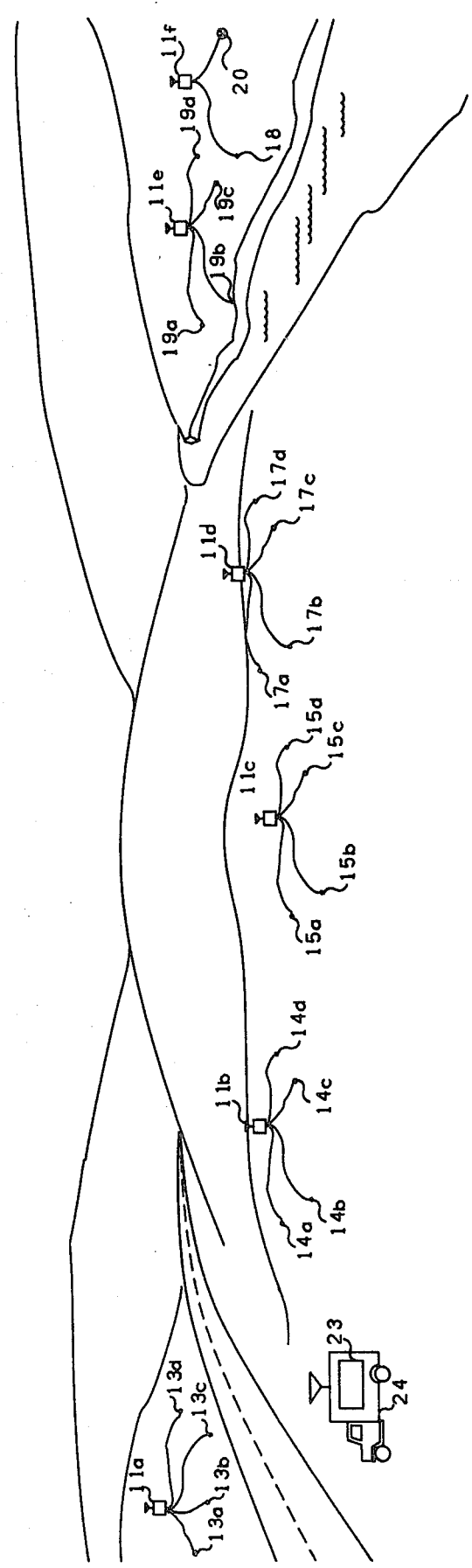
FIG. 1 is an illustration of a possible physical arrangement of the components of the seismic exploration system.
Figure 2A:
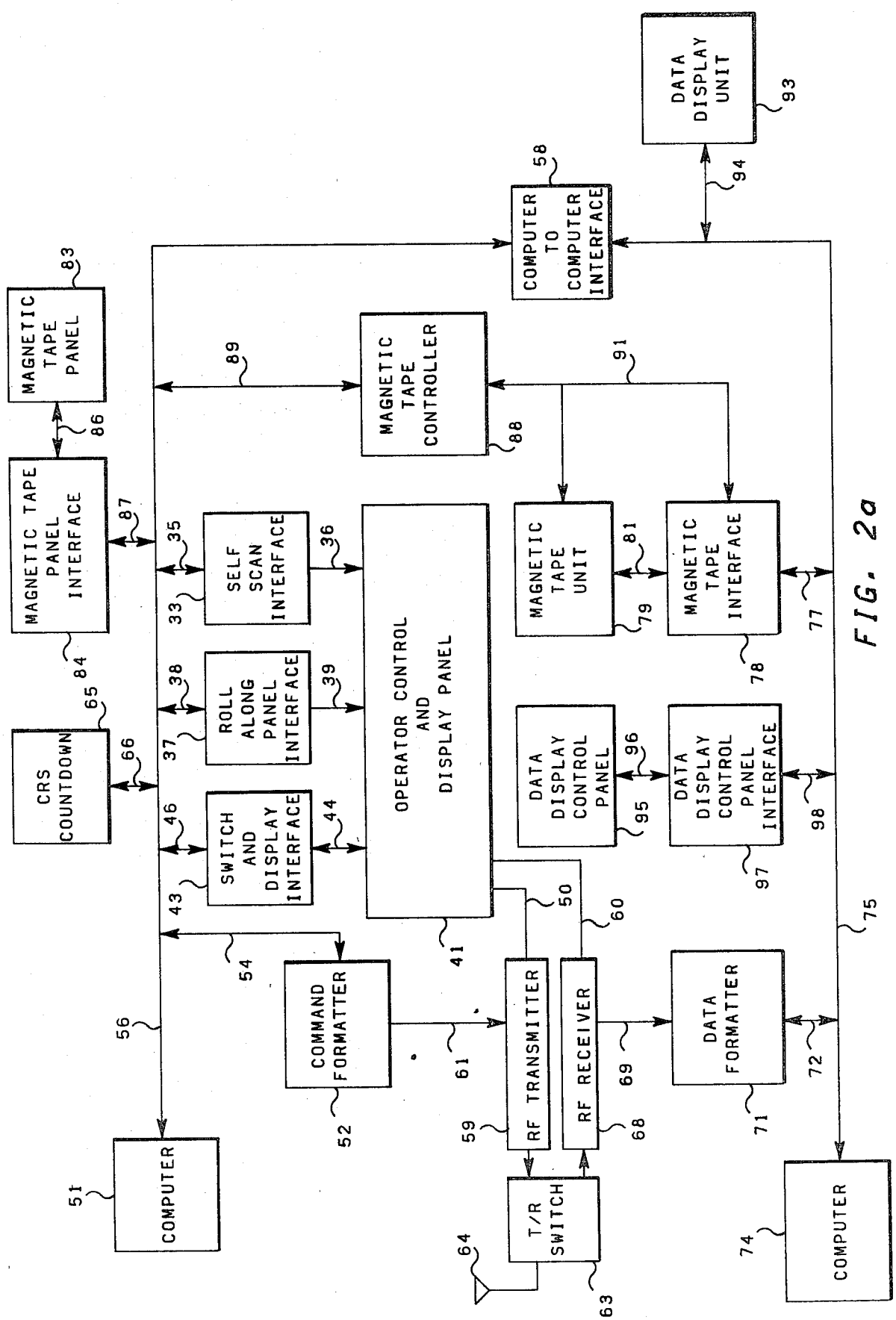
FIG. 2a is a block diagram of a central recording station.
Figure 2B:
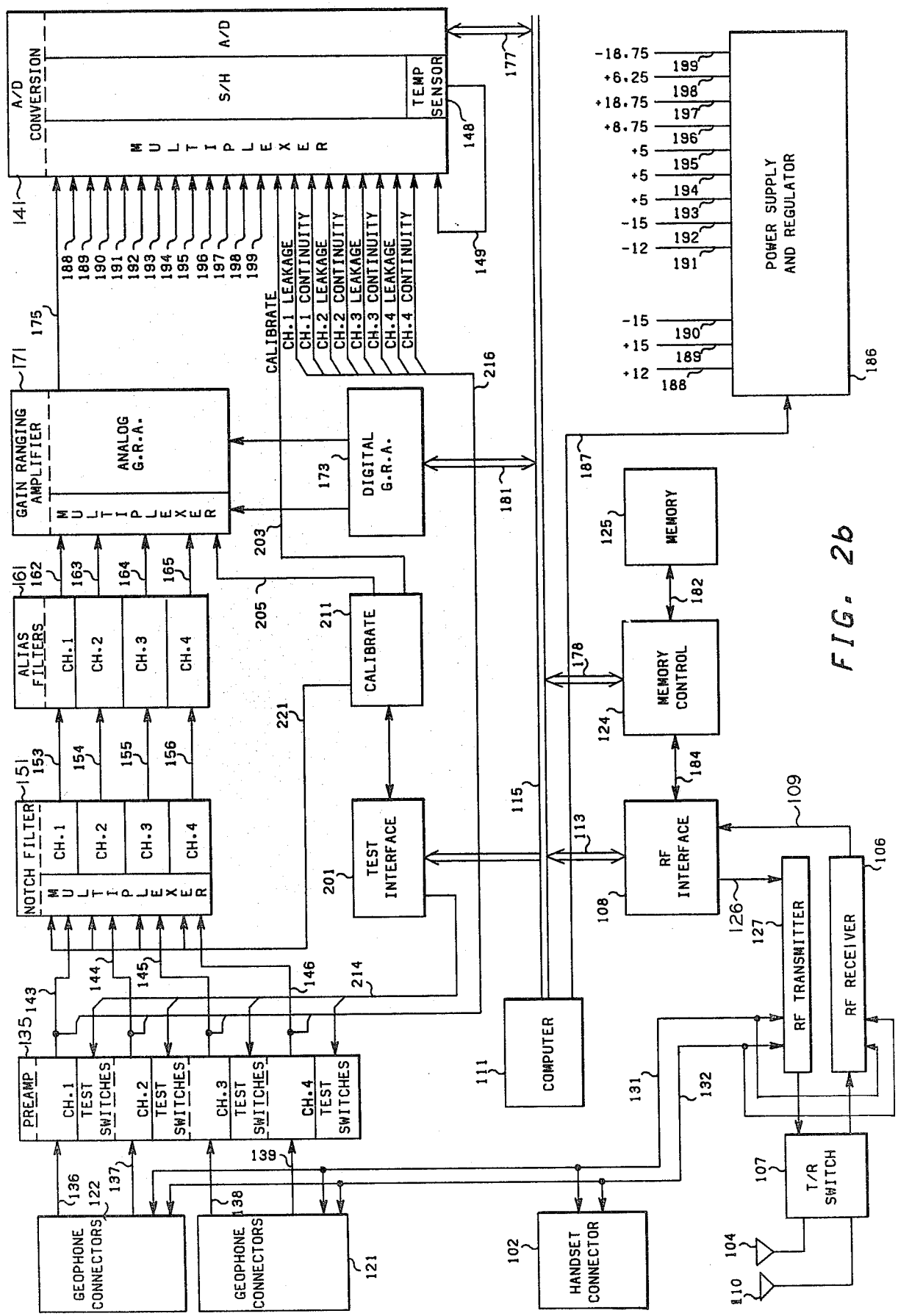
FIG. 2b is a block diagram of a remote telemetry unit.
Figure 18:
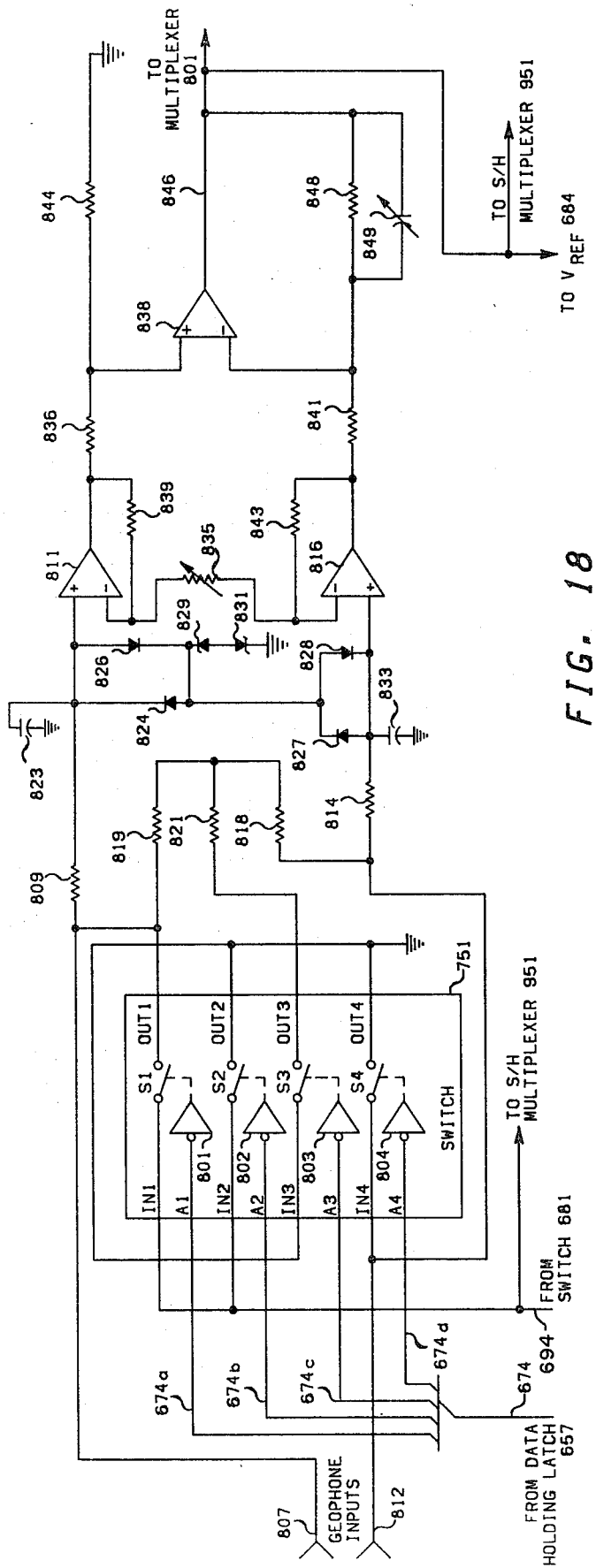
FIG. 18 is a schematic of the preamplifier illustrated in FIG. 2b.

FIGS. 3–17 and 19–73 of U.S. Pat. No. 4,257,098 are hereby incorporated by reference. The brief description of the FIGS. 3–17 and 19–73 in U.S. Pat. No. 4,257,098 is also hereby incorporated by reference.

The detailed description of the drawings and the Appendix of U.S. Pat. No. 4,257,098 are hereby incorporated by reference.

That which is claimed is:

1. A seismic system for geophysical exploration comprising:
a plurality of remote geophone monitoring means, each of said remote geophone monitoring means being adapted to receive electrical signals from at least one geophone means; and
a central control means for generating electrical signals for initiating the operation of said plurality of remote geophone monitoring means;
said central control means comprising:
means for generating a test command representative of a command to perform a geophone test;
means for transmitting said test command to at least one of said plurality of remote geophone monitoring means; and
means for receiving test data from at least one of said plurality of remote geophone monitoring means, said test data providing information as to the operational status of at least one geophone means;
each of said plurality of remote geophone monitoring means comprising:
means for receiving said test command from said central control means;
means for supplying a reference voltage;
a first switching means;
means for closing said first switching means in response to said test command to thereby supply said reference voltage through said first switching means to said geophone means;
means for measuring any voltage present between said geophone means and ground, the difference between said reference voltage and any voltage present between said geophone means and ground being representative of the leakage resistance between said geophone means and ground; and
means for transmitting the leakage resistance between said geophone means and ground as said test data to said central control means.

2. A seismic system for geophysical exploration comprising:
a plurality of remote geophone monitoring means, each of said remote geophone monitoring means being adapted to receive electrical signals from at least one geophone means; and
a central control means for generating electrical signals for initiating the operation of said plurality of remote geophone monitoring means;
said central control means comprising:
means for generating a test command representative of a command to perform a geophone test;
means for transmitting said test command to at least one of said plurality of remote geophone monitoring means; and
means for receiving test data from at least one of said plurality of remote geophone monitoring means, said test data providing information as to the operational status of at least one geophone means;
each of said plurality of remote geophone monitoring means comprising:
means for receiving said test command from said central control means;
means for supplying a reference voltage;
a first switching means;
a second switching means;
means for closing said first switching means in response to said test command to thereby supply said reference voltage through said first switching means to a first terminal of said geophone means;
means for closing said second switching means in response to said test command to thereby ground a second terminal of said geophone means to thereby induce a current flow through said geophone means;
means for measuring any voltage present across said first terminal and said second terminal of said geophone means, any voltage present between said first terminal and said second terminal of said geophone means being proportional to the internal resistance of said geophone means; and
means for transmitting the internal resistance of said geophone means as said test data to said central control means.

3. A seismic system for geophysical exploration comprising:
a plurality of remote geophone monitoring means, each of said remote geophone monitoring means being adapted to receive electrical signals from at least one geophone means; and
a central control means for generating electrical signals for initiating the operation of said plurality of remote geophone monitoring means;
said central control means comprising:
means for generating a test command representative of a command to perform a geophone test;
means for transmitting said test command to at least one of said plurality of remote geophone monitoring means; and
means for receiving test data from at least one of said plurality of remote geophone monitoring means, said test data providing information as to the operational status of at least one geophone means;
each of said plurality of remote geophone monitoring means comprising:
means for receiving said test command from said central control means;
means for supplying a reference voltage;

a first switching means;

a second switching means;

means for closing said first switching means in response to said test command to thereby supply said reference voltage through said first switching means to a first terminal of said geophone means;

means for closing said second switching means in response to said test command to thereby ground a second terminal of said geophone means to thereby set up a voltage across said first terminal and said second terminal of said geophone means to thereby levitate the mass of said geophone means;

means for opening said first switching means and said second switching means to thereby release the mass of said geophone means, the voltage supplied from said geophone means in response to the releasing of the mass of said geophone means being representative of the response characteristics of said geophone means; and means for transmitting the response characteristics of said geophone means as said test data to said central control means.

4. A method for testing a geophone means comprising the steps of:

generating a test command representative of a command to perform a geophone test;

transmitting said test command from a central control means to a remote geophone monitoring means;

closing a first switching means in response to said test command to thereby supply a reference voltage through said first switching means to said geophone means;

measuring any voltage present between said geophone means and ground, the difference between said reference voltage and any voltage present between said geophone means and ground being representative of the leakage resistance between said geophone means and ground; and transmitting the leakage resistance between said geophone means and ground to said central control means.

5. A method for testing a geophone means comprising the steps of:

generating a test command representative of a command to perform a geophone test;

transmitting said test command from a central control means to a remote geophone monitoring means;

closing a first switching means in response to said test command to thereby supply a reference voltage through said first switching means to a first terminal of said geophone means;

closing a second switching means in response to said test command to thereby ground a second terminal of said geophone means to thereby induce a current flow through said geophone means;

measuring any voltage present across said first terminal and said second terminal of said geophone means, any voltage present between said first terminal and said second terminal of said geophone means being proportional to the internal resistance of said geophone means; and transmitting the internal resistance of said geophone means to said central control means.

6. A method for testing a geophone means comprising the steps of:

generating a test command representative of a command to perform a geophone test;

transmitting said test command from a central control means to a remote geophone monitoring means;

closing a first switching means in response to said test command to thereby supply a reference voltage through said first switching means to a first terminal of said geophone means;

closing a second switching means in response to said test command to thereby ground a second terminal of said geophone means to thereby set up a voltage across the said first terminal and said second terminal of said geophone means to thereby levitate the mass of said geophone means;

opening said first switching means and said second switching means to thereby release the mass of said geophone means, the voltage supplied from said geophone means in response to the releasing of the mass of said geophone means being representative of the response characteristics of said geophone means; and transmitting the response characteristics of said geophone means to said central control means.

* * * * *